Oct. 18, 1927.
G. S. APELDORN
WATER SOFTENING SYSTEM
Filed June 26, 1925
1,646,270
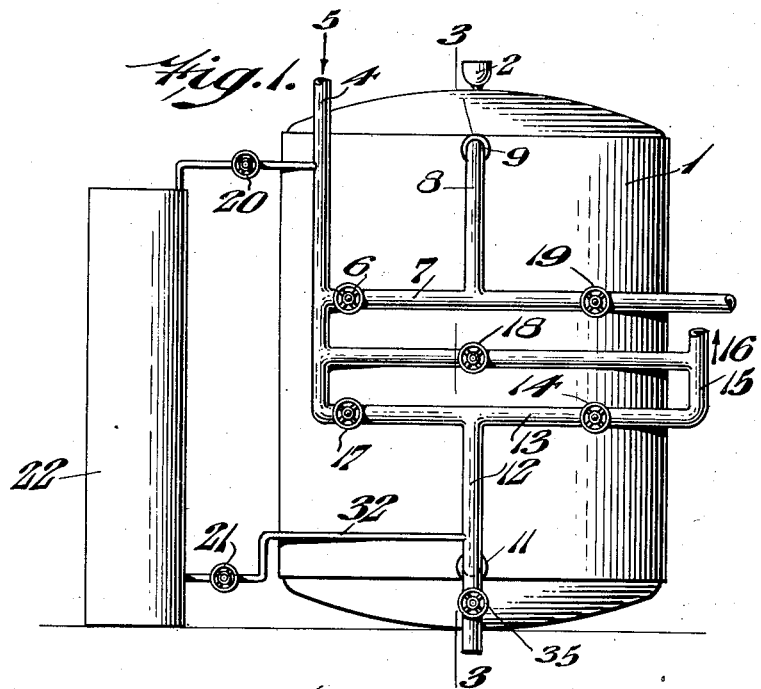
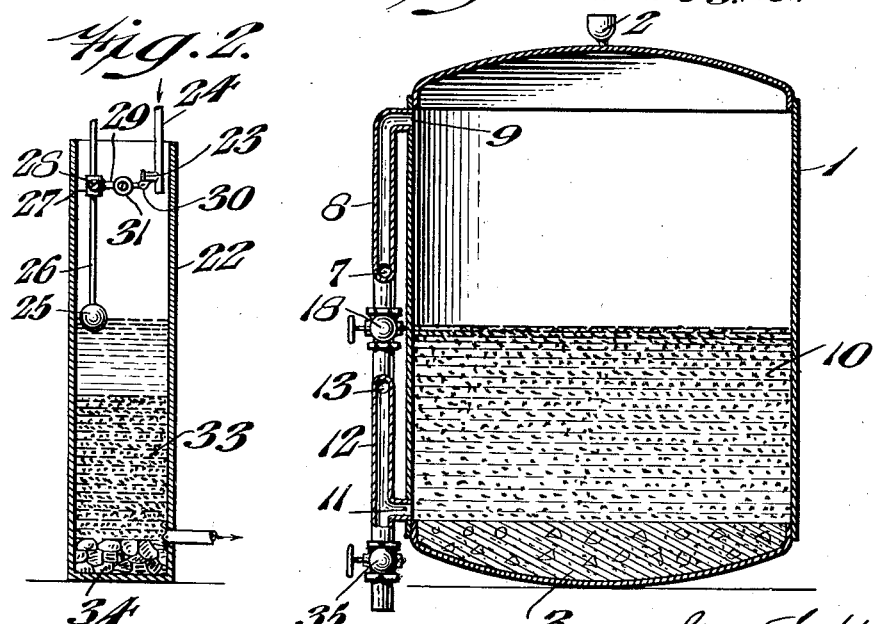
INVENTOR:
Guy S. Apeldorn.
BY
ATTORNEYS Patented Oct. 18, 1927.

1,646,270

UNITED STATES PATENT OFFICE.

GUY S. APELDORN, OF PHILADELPHIA, PENNSYLVANIA.

WATER-SOFTENING SYSTEM.

Application filed June 26, 1925. Serial No. 39,704.

My invention relates to a new and useful system of water "softening" and novel apparatus therefor. My invention relates more particularly to a system of water softening wherein a zeolite is employed as the softening medium, which zeolite is revivified or regenerated by a suitable chemical agent, usually common salt.

In systems of this type known heretofore, it has always been difficult and cumbersome to regenerate the zeolite, without an undue waste of salt solution, and the use of large and bulky regenerating apparatus, usually requiring as much room as the softening machine itself. Thus, in zeolite water softening systems used heretofore, it has always been a considerable task to reconvert the spent zeolite, for a subsequent run; due to the fact that no practical means have been devised so far, for supplying to the zeolite tank, a given quantity of the regenerating salt solution, of a given strength.

In apparatus of this type constructed heretofore, it has been the practice to employ a "gravity" salt tank, in combination with the zeolite tank, which gravity tank would usually be approximately the same size and capacity as the zeolite tank itself, and communication with said tank through a pipe and valve at the bottom; which "gravity tank" was then filled with a quantity of regenerating salt solution, approximately twice the volume required to regenerate the zeolite in order to allow such solution to pass into the zeolite tank, which has been previously drained, and to percolate through the layer of zeolite, until the levels in the two tanks have been equalized. In this method, the quantity of solution actually added has always been somewhat uncertain, due to the fact that it depended upon the liquid displacement within the zeolite tank, and furthermore a large quantity of regenerating solution always remained unused, in the gravity tank.

Another method used heretofore for regenerating the zeolite, has been to force into said zeolite tank, a concentrated solution of the regenerating reagent, with the aid of a pressure injector, using water under pressure, which water would then dilute the concentrated solution. The dilution thus obtained, however, is also uncertain and hence this method has not been entirely successful.

In my novel water softening system I employ a regenerating tank of considerably smaller size and capacity than the main zeolite tank, and provide means at the bottom thereof for retaining a layer of the solid regenerating reagent usually common rock salt, and provide means at the upper portion thereof for supplying a constant stream of water to said solid reagent, until the level of the water reaches a given height within such tank; said regenerating tank being connected with the zeolite tank at a relatively low point, so that the levels in the two tanks may be equalized by gravity to whatever level it may be desired.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1 represents a front view of an elevation, of novel apparatus embodying my invention.

Figure 2 represents an elevation in section, of the regenerating tank embodying my invention.

Figure 3 represents a section on line 3—3 of Figure 1 showing the zeolite tank.

Referring to the drawings, in which like reference characters indicate like parts, 1 designates the zeolite softening tank, having an air trap 2 at the top, and being provided with a concrete filling 3 at the bottom thereof, as shown particularly in Figure 3.

The tank 1 is filled with the granular zeolite, to a suitable height, as is the usual practice and the water from the source, such as the city mains, is then passed through the pipe 4 in the direction of the arrow 5, through the valves 6, and the pipes 7 and 8, into the upper portion of the tank 1, through the inlet opening 9. From here the water percolates through the mass of zeolite 10, and leaves the tank 1 through the opening 11, through the pipes 12 and 13, the valve 14, and out through the pipe 15 in the direction of the arrow 16, to the point where it is to be used or consumed. During the softening run, the valves 17, 18, 19, 20, 21, and 35, are closed.

After the zeolite has been used a certain length of time it becomes exhausted or spent, by the replacement of sodium in the zeolite, with the magnesium and calcium of the magnesium sulphate and calcium bicarbonate respectively, in the water. In order to regenerate or revivify the mass of zeolite, that is, to release from it the calcium and magnesium in combination therewith, and in order to remove such calcium and magnesium in a soluble form by means of a subsequent washing, the zeolite is treated with a solution of sodium chloride. In order to permit the addition of a salt solution of a given quantity and a given strength or concentration, I provide a regenerating tank 22, of a relatively small diameter and small capacity, merely large enough to contain the solid salt, usually rock salt, which is to be used to make up the solution. The quantity of water to be used in making up the solution is measured within the main zeolite tank 1, with the aid of a float controlled valve 23, of any suitable standard construction, on the end of the water supply pipe 24, which connects with the main water supply pipe 4. The float 25 is carried by the rod 26, adjustable vertically within the collar 27, by means of the set screw 28, which in turn is carried by the operating lever 29 of the valve 23, pivoted at 30, and having an adjustable elbow 31, whereby the float 25 may be adjusted within suitable vertical limits relative to the tank 22.

The tank 22 is connected to the pipe 12 and hence to the bottom inlet 11 of the tank 1, through the pipe 32 and the valve 21. Thus, the water in the two tanks 1 and 22 will naturally come to the same level when the valve 21 is open. To revivify the zeolite, after the same has been exhausted, all the valves but 35 are closed, and the tank 1 is drained through the valve 35. In order to supply a given quantity of salt solution, of a given strength, to the tank 1, (after the same has been drained) it is only necessary to measure out a quantity of rock salt, proportioned according to the quantity of zeolite present in the tank 1, (which is a known factor), to place this quantity of salt 33, into the bottom of tank 22, preferably upon a gravel bottom 34, and then adjusting the height of the float 25, to correspond to the height of the water liquid necessary within the tank 1, which will give the desired concentration of salt, when the given quantity of salt is dissolved therein. After this, the valves 20 and 21 are opened to permit the water to run into the tank 22 through the layer of salt, and in and through the pipe 32, into and through the zeolite tank 1, where it rises and percolates through the mass, by gravity. Thus, as the water passes through the salt mass 33, it dissolves the same and carries the solution into the tank 1, flooding the zeolite. This flow of salt solution will then continue until the water in the main tank 1 has reached the level of the float 25 in the regenerating tank 22. At this point the two levels of water rise to the float 25, causing the same to rise a slight distance and thereby to shut off the valve 23. By this novel system, the salt is washed into the zeolite tank 1 completely so that no salt is wasted, and a relatively small quantity of practically fresh water remains in the tank 22.

After the zeolite has thus been flooded with the salt solution for a suitable period, the salt solution is drained and washed out, and the zeolite is again ready for use. In the usual operation of a zeolite water softening machine, the regeneration is carried out during the night time, or when the machine is not in use. Thus at the end of the day the tank 1 is drained and the requisite amount of salt is measured into the regenerating tank 22. Then the valves 6, 14, 17, 18, 19 and 35 are closed and the valves 20 and 21 are opened. The float 25 is then adjusted to the suitable height. The apparatus is allowed to remain in this condition throughout the night. During this period, the water issuing from pipe 24, through the valve 23, percolates through the salt 33, and the salt solution thus formed passes over into the zeolite tank 1, where it percolates through and floods the zeolite mass 10. The salt solution rises to the level of the float 25, after which, the water is automatically shut off at 23, thus leaving a fixed quantity of salt solution of a fixed concentration, within the tank. In the morning following, the salt solution is drained and washed out and the zeolite is again ready for another run.

Having thus described my invention, what I claim as new and desire to secure by Letters Patent, is:—

1. In a water softening system, a softening tank, an inlet pipe provided with a plurality of branches, the upper branch having a vertical extension leading to the top of said tank, and being provided with valves on on each side of said vertical extension, the lower of said branches having a pendant extension leading to the bottom of said tank and being provided with valves on each side of said pendant extension, an intermediate valved branch leading from said inlet pipe to the exit from said lower branch, a valved outlet leading from the bottom of said tank, a regenerating tank, an inlet pipe leading thereinto, an upper valved pipe leading from the top of said regenerating tank to said inlet and a lower valved pipe leading from the bottom of said regenerating tank to said lower pendant extension.

2. In a water softening system, a softening tank, an inlet pipe provided with a plurality of lateral branches, the upper branch having a vertical extension leading to the top of said tank, and being provided with valves on each side of said vertical extension, the lower of said branches having a pendant extension leading to the bottom of said tank and being provided with valves on each side of said pendant extension, an intermediate lateral valved branch leading from said inlet pipe to the exit from said lower branch, a valved outlet leading from the bottom of said tank, a regenerating tank, an inlet pipe leading thereinto, an upper valved pipe leading from the top of said regenerating tank to said inlet pipe, a lower valved pipe leading from the bottom of said regenerating tank to said lower pendant extension, and a float controlled device for the inlet pipe to said regenerating tank.

GUY S. APELDORN.